US012700215B2

(12) United States Patent (10) Patent No.: US 12,700,215 B2
Highnam (45) Date of Patent: Aug. 4, 2026

(54) METHOD AND NETWORK TO EMBED IMAGE DATA AND META DATA

(71) Applicant: LUNIT INTERNATIONAL LIMITED, Wellington (NZ)

(72) Inventor: Ralph Highnam, Wellington (NZ)

(73) Assignee: LUNIT INTERNATIONAL LIMITED, Wellington (NZ)

( * ) Notice: Subject to any disclaimer, the term of this patent is extended or adjusted under 35 U.S.C. 154(b) by 321 days.

(21) Appl. No.: 18/031,850

(22) PCT Filed: Nov. 12, 2021

(86) PCT No.: PCT/IB2021/060509
§ 371 (c)(1),
(2) Date: Apr. 13, 2023

(87) PCT Pub. No.: WO2022/101845
PCT Pub. Date: May 19, 2022

(65) Prior Publication Data
US 2023/0410471 A1 Dec. 21, 2023

(30) Foreign Application Priority Data

Nov. 12, 2020 (GB) ...................................... 2017851

(51) Int. Cl.
*G06V 10/764* (2022.01)
*G06V 10/778* (2022.01)
*G06V 10/82* (2022.01)
(52) U.S. Cl.
CPC ........ *G06V 10/764* (2022.01); *G06V 10/7788* (2022.01); *G06V 10/82* (2022.01); *G06V 2201/03* (2022.01); *G06V 2201/10* (2022.01)

(58) Field of Classification Search
CPC .. G06V 10/764; G06V 10/7788; G06V 10/82; G06V 2201/03; G06V 2201/10; G06V 10/454
See application file for complete search history.

(56) References Cited

U.S. PATENT DOCUMENTS

| | | | | |
|---|---|---|---|---|
| 2017/0357896 | A1* | 12/2017 | Tsatsin | .................. G06N 3/045 |
| 2018/0012110 | A1* | 1/2018 | Souche | ................ G06V 10/454 |
| 2018/0350459 | A1 | 12/2018 | Yang | |
| 2020/0160042 | A1 | 5/2020 | Bui | |

(Continued)

OTHER PUBLICATIONS

International Search Report issued in PCT/IB2021/060509, dated Feb. 15, 2022, 4 pgs.

(Continued)

*Primary Examiner* — Jennifer Mehmood
*Assistant Examiner* — Vaisali Rao Koppolu
(74) *Attorney, Agent, or Firm* — HOLLAND & HART LLP

(57) ABSTRACT

The present invention relates to a system and method to embed meta data from an imaging and communications system whereby the meta data is combined with image data as an input to a deep learning network. An image classification learning network is disclosed which comprises: a means to input image data and meta data; and an embedding layer comprising learnable embedding weights to encode the meta data to provide a learned object, and a softmax layer to classify a combination of the image data and the learned object.

11 Claims, 4 Drawing Sheets

(56) References Cited

U.S. PATENT DOCUMENTS

| 2020/0272822 | A1 |   | 8/2020 | Lin |
|---|---|---|---|---|
| 2020/0334809 | A1 | * | 10/2020 | Vianu ................ G06V 30/1916 |
| 2023/0071400 | A1 | * | 3/2023 | Abdolell ................ G16H 30/20 |

OTHER PUBLICATIONS

Written Opinion of the International Searching Authority issued in PCT/IB2021/060509, dated Feb. 15, 2022, 9 pgs.

* cited by examiner

Meta data vector     Learnable embedding weights m x n          Embedding matrix m x n Embedding matrix m x n          Fully connected layer
                                (224 x 224 x 1) neurons

METHOD AND NETWORK TO EMBED IMAGE DATA AND META DATA

CROSS-REFERENCE TO RELATED APPLICATIONS

This is a national phase application of International Application No. PCT/IB2021/060509, filed 12 Nov. 2021, which claims the benefit of GB Patent Application No. 2017851.3, filed 12 Nov. 2020, the disclosures of which are incorporated herein, in their entireties, by this reference.

FIELD OF THE INVENTION

The present invention relates to a system and method to embed meta data from an imaging and communications system whereby the meta data is combined with image data as an input to a deep learning network.

BACKGROUND

In medical imaging, classification of images in accordance with clinically accepted classification systems helps diagnosis and the appraisal of risk of disease.

For example, the Breast Imaging-Reporting and Data System (BI-RADS®) classifies mammograms via an overall assessment of the volume of attenuating tissues in a breast, to help indicate the relative possibility that a lesion could be obscured by tissue, and to indicate whether the sensitivity of the examination may be compromised for example by the presence of fibroglandular breast tissue. The BI-RADS system classifies breast tissue composition via four categories:

'a' wherein the breasts are almost entirely fatty, indicating that unless an area containing cancer is not included in the image field of the mammogram, mammography is highly sensitive in this setting;

'b' wherein there are scattered areas of fibroglandular density;

'c' wherein the breasts are heterogeneously dense, which may obscure small masses. This category can be elaborated upon i.e. with a description of the location(s) of the denser tissue in which small noncalcified lesions may be obscured;

'd' wherein the breasts are extremely dense and the sensitivity of mammography is low.

Medical images (X-rays) can be inconsistent across various manufacturers and modalities where the imaging conditions and physics parameters are distinct. For example, in mammography tomosynthesis entails a higher kilovoltage peak (kvp) and tomosynthesis images show less breast tissue density than conventional mammography.

Furthermore, classification systems often rely on visual assessment and there is consequently intra- and inter-observer variation, in particular between adjacent classification categories.

In contrast, a trained deep learning network can yield objective and consistent readings. A deep learning network trains a deep learning model to recognize defined 'target' classes using labelled examples: taking a medical image such as an input and after layers of mathematical operations, the network outputs probabilities of classification categories to which the image, or feature of the image, might belong. To mitigate against variation in X-ray images as an input, the input images are normalized.

Normalization is a process that changes the range of pixel intensity values, usually to bring an image (or other type of signal), into a specified range and thus achieve consistency across the set of data. Such normalization is challenging: for example, pixels may be saturated after contrast adjustment so that for example in medical imaging tissues of different composition share the same pixel intensity. With reference again to mammography, fibroglandular breast tissue and highly attenuated objects (e.g. calcifications) may share the same pixel intensity range after normalization. Normalized images may also show differences across various X-ray imaging conditions such as imaging with and without anti-scatter grid.

The term 'meta data' refers to any numerical and categorical data: for example, in medical imaging, the images are stored as DICOM® objects. DICOM (Digital Imaging and Communications in Medicine) is an international standard for the communication, exchange, transmission and management of medical imaging information across various imaging modalities (radiography, ultrasonography, computed tomography, magnetic resonance imaging and radiation therapy). DICOM files contain meta data that provide information about the image data such as the size, dimensions, bit depth, modality and equipment settings in mammography, DICOM image meta data includes compression force, kvp, half-value layer (HVL for the computation of average glandular radiation dose/radiation risk), breast compression thickness and meta data of physics parameters.

SUMMARY OF THE INVENTION

According to an aspect of the invention there is an image classification learning network comprising: a means to input image data and meta data; and an embedding layer comprising learnable embedding weights to encode or modulate the meta data to provide a learned object, and a softmax layer to classify a combination of the image data and the learned object.

During a training phase, the network learns the correlation between raw image data and meta data such that an image pre-normalization stage is no longer required.

This introduces a method to embed meta data and combine them with image data as an input to a deep learning network, whereby the network learns the correlation between raw image data and meta data during a training phase, so that image pre-normalization is not required. The challenges of image pre-normalization are thereby surmounted. The embedding network learns a correlation between raw image and meta data, then autonomously normalizes the image implicitly.

The embedding layer preferably yields: the application of embedding weights; regression via fully connected layer; and reshaping to target dimension.

The input means may be configured to extract the image data and/or the meta data from a DICOM® object defined by an international standard for the communication, exchange, transmission and management of medical imaging information across various imaging modalities. This may be adapted. For example, an aspect may be an image classification learning network comprising: a means to input image data and a means to input numerical and categorical data about the image data including size, dimensions, bit depth, modality and/or equipment settings; and an embedding layer comprising learnable embedding weights to encode the meta data to provide a learned object, and a softmax layer to classify a combination of the image data and the learned object. The numerical and categorical data may include DICOM image meta data such as compression force, kvp, half-value layer (HVL for the computation of average glandular radiation dose/radiation risk), breast compression thickness and/or meta data of physics parameters. So the image classification learning network may be adapted to medical imaging.

The embedding layer may comprise a connected layer of neurons to regress an embedding matrix comprising the learnable embedding weights when encoded with the meta data. The embedding matrix may be connected to the fully connected layer of neurons.

The embedding layer may comprise a multiplication of a meta data vector comprising the meta data multiplying a weights matrix comprising the learnable embedding weights to create the embedding matrix. The weights matrix may comprise one row of the learnable embedding weights to weight all elements of the meta data equally. The weights matrix may comprise a number of rows equal to a number of elements of the meta data to weight the elements of the meta data individually. The number of learnable embedding weights may be selectable by a user to influence accuracy of classification.

The image classification convolution network may comprise a convolution layer configured to convolve the learned object provided by the embedding layer when concatenated with the image data. The convolution layer may follow a concatenation layer which combines the image data with the learned object.

The image classification convolution network may comprise a convolution layer configured to provide convolved image data which are further concatenated with the learned object from the embedding layer. The convolution layer configured to provide convolved image data which are to be concatenated with the learned object. The convolution layer may lead a concatenation layer which combines the image data convolved by the convolution layer with the learned object.

Features of an image extracted from image data and/or learned object may be associated by the softmax layer with respective classes. The softmax layer may provide a probability that a feature is belong in a class. The softmax layer may be configured to provide a probability that a classification category characterizes an image or feature from the image data and meta data.

According to a second aspect of the invention there is an image classification learning method including: inputting image data and meta data from a standardized transmission or storage; transferring the meta data to an embedding layer wherein the learnable embedding weights encode or modulate the meta data to provide a learned object, and using a softmax layer to classify a combination of the image data and the learned object.

During a learning phase, the embedding weights may be updated spontaneously. These embedding weights may convert the meta data to an encoding that associates an image with a category of classification that is targeted, or improves a probability of achieving the category of classification that is targeted. The learnable embedding weights may be modulated with the meta data to provide the learned object.

The invention will now be described, by way of example only, with reference to the accompanying figures in which:

DETAILED DESCRIPTION OF THE INVENTION

Figure 1:
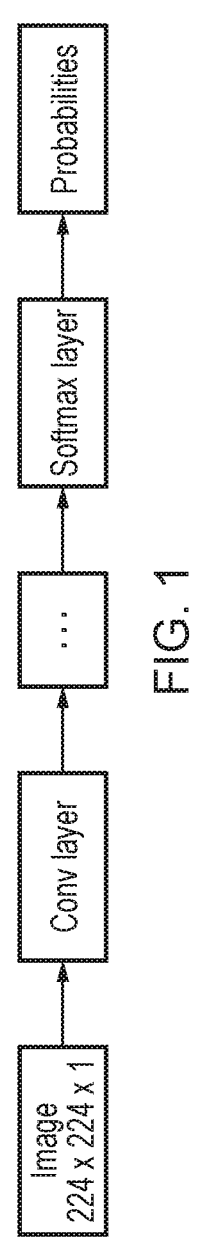
FIG. 1 shows a standard workflow of image classification in deep learning network.

As shown in FIG. 1, one of the inputs is an image of for example 224×224×1 where the last dimension indicates a gray-scale single channel image. The final output layer in the deep learning network performs multi-class classification. The output layer is a softmax function that maps extracted image features to a vector with number-of-class elements. The index of the element represents a class, and the element value is a probability to which class the image belongs. In the figures "cony" denotes convolution and "concat" denotes concatenation.

Figure 2:
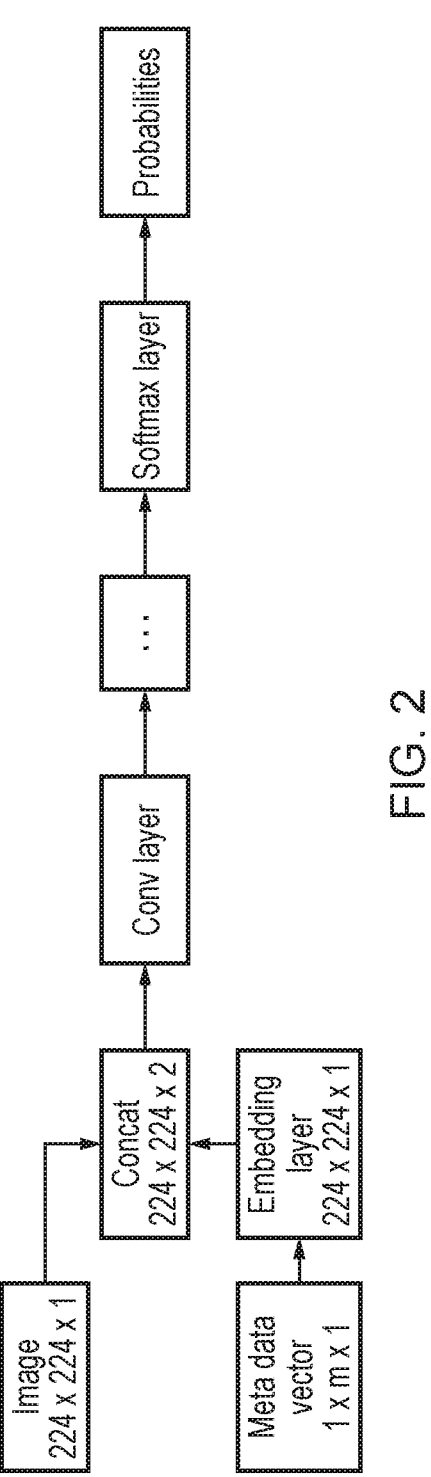
FIG. 2 shows the proposed structure of a network taking both raw image data and meta data.

An image classification learning network is shown in FIG. 2. The image classification and learning network comprises a means to input image data and meta data. The image classification and learning network also comprises an embedding layer comprising learnable embedding weights to encode or modulate the meta data to provide a learned object. There is a softmax layer to classify a combination of the image data and the learned object. Image classification learning networks of this type are also shown in FIGS. 7 and 8.

In the image classification learning network shown in FIG. 2 the convolution layer follows the concatenation layer. The concatenation layer combines the image data with the learned object from the embedding layer. The convolution layer convolves the learned object from the embedding layer concatenated with the image data.

As shown in FIG. 2, the network takes both raw image data and meta data. An embedding layer encodes meta data to a 224×224×1 matrix; a concatenate (concat) layer combines image data and the embedding matrix along the channel. An embedding layer contains a weights matrix and a fully connected layer. The embedding layer first embeds the meta data vector with the weights matrix to an embedding matrix, which is further regressed by the fully connected layer to a vector of specified size, so it can be reshaped to match the dimension of image data. For example, the fully connected layer has 50,176 (=224×224×1) neurons, the output is a regression vector of 50,176 elements, which can be reshaped to 224×224×1 to match with image data dimension.

Figures 7, 8:
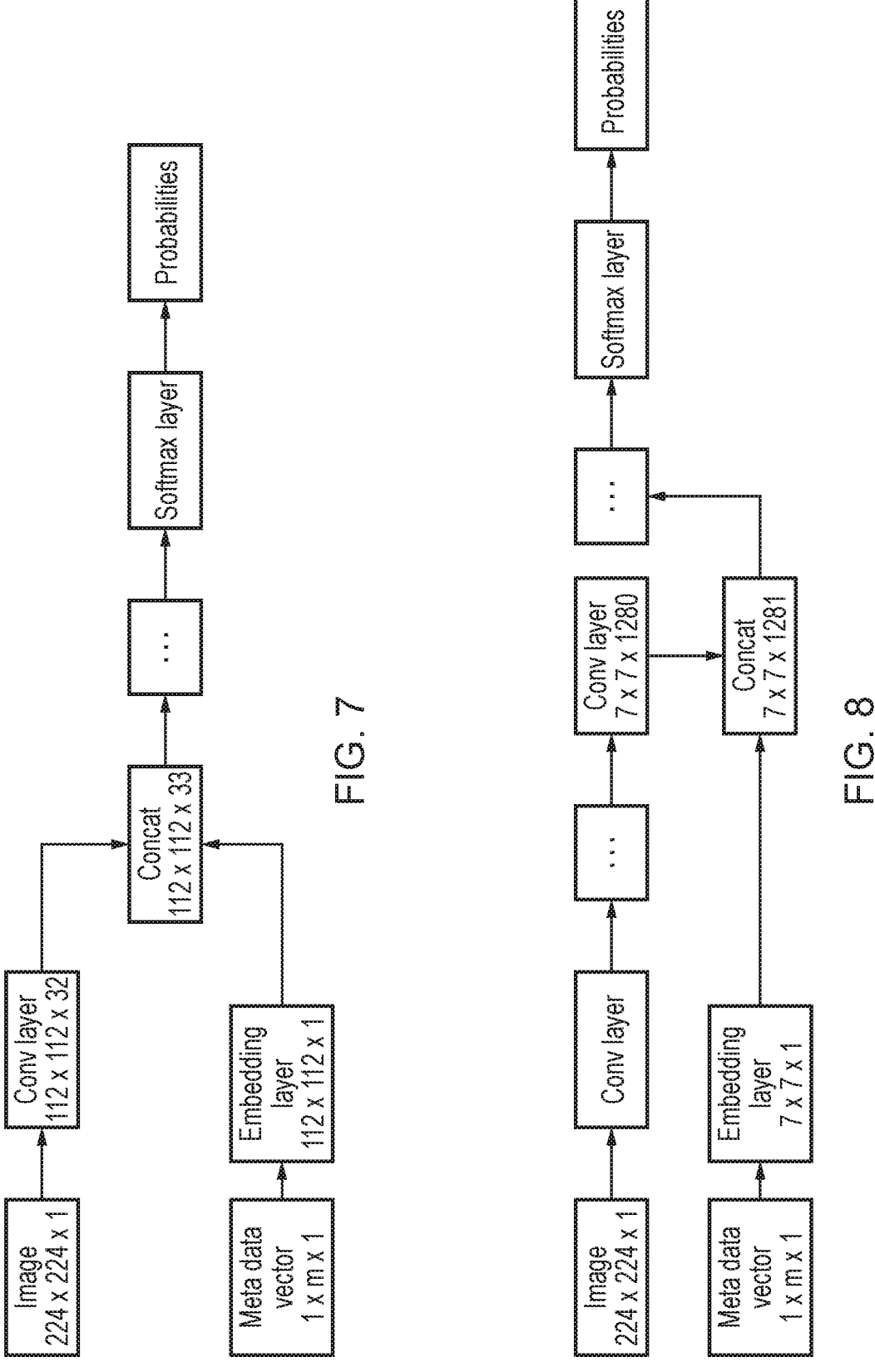
FIG. 7 shows a second proposed structure of a network taking both raw image data and meta data.
FIG. 8 shows a third proposed structure of a network taking both raw image data and meta data.

In the image classification learning networks shown in FIGS. 7 and 8 a convolution layer leads a concatenation layer. The convolution layer convolves the image data to provide convolved image data. The concatenation layer concatenates the convolved image data with the learned object from the embedding layer.

More generally assuming a meta data vector of m elements, and embedding dimension n, an embedding weight matrix m×n may be randomly initialised. The matrix elements may be learnable during training. Once the network is trained, each element in the meta data vector can be represented as a feature vector by multiplying the said element with the corresponding row of embedding weights.

There is a method to embed meta data and combine it with image data as an input to a deep learning network, whereby a network learns the correlation between raw image data and meta data during a training phase, so that image pre-normalization is not required, and comprising the steps of:

Embedding network With reference to FIG. 1, the input is a normalized image of 224×224×1 where the last dimension indicates a gray-scale single channel image. The outputs from the softmax layer are probabilities of the categories to which the image belongs.

FIG. 2 represents a proposed structure of a network taking both raw image data and meta data. Assuming m meta data points, the embedding layer encodes these data to a 224× 224×1 matrix.

A concatenate (concat) layer combines image data and embedding matrix along the channel. The remaining network structure is unchanged.

Figure 3:
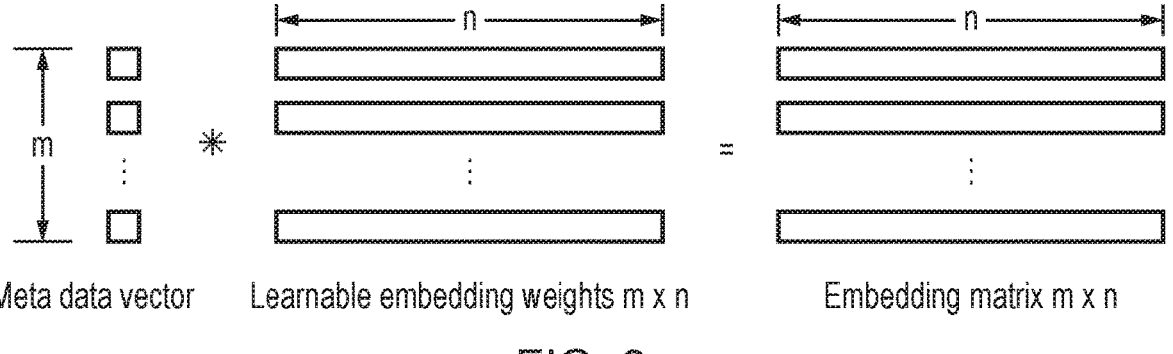
FIG. 3 shows meta data vector, learnable embedding weights m×n and embedding matrix m×n.

Embedding layer An embedding layer comprises an embedding weights matrix and a fully connected layer. The embedding layer embeds the meta data vector to an embedding matrix, and the fully connected layer regresses the embedding matrix to a vector of desired size so it can be reshaped to match with the dimension of image data. More specifically, with reference to FIG. 3, assume meta data vector of m elements, and embedding dimension n: where the embedding weights matrix m×n is randomly initialised, and they are learnable during training. Once the network is trained, each element in the meta data vector can be represented as a feature vector by multiplying the said element with the corresponding row of embedding weights.

Figure 4:
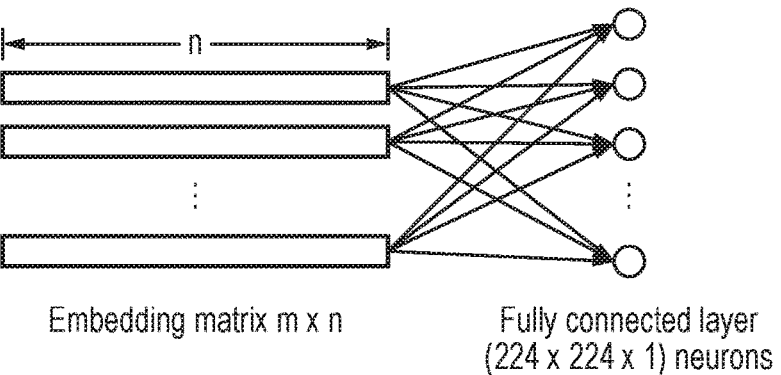
FIG. 4 shows an embedding matrix m×n connecting to a fully connected layer.

The embedding matrix is then passed to a fully connected layer for example with (=224×224×1) neurons. The output is a regression vector of 50,176 elements, which is further reshaped to 224×224×1 to match with image data dimension as shown in FIG. 4.

Figure 5:
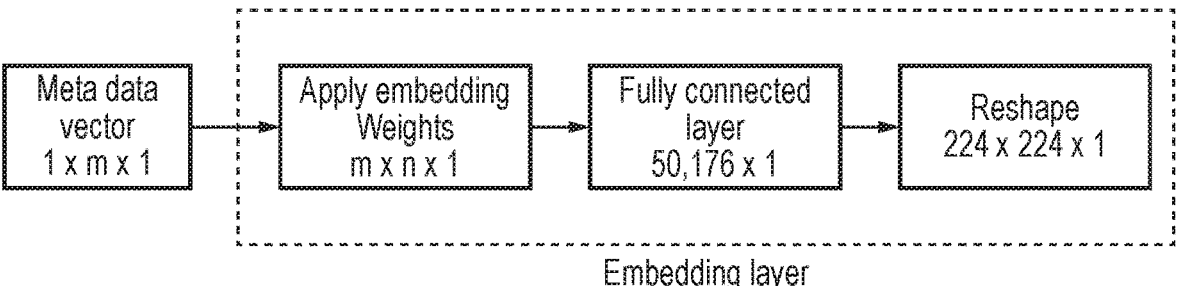
FIG. 5 shows three components of the embedding layer.

The embedding layer thus achieves three operations: the application of embedding weights; regression via fully connected layer; and reshaping to target dimension as shown in FIG. 5.

By way of illustrative example, we take up to 50,000 images and associated single image BI-RADS from a classification project. We separate these into training, validation and test splits as 80%, 10% and 10% respectively. Raw image data are extracted from DICOM objects, and further resized to 224×224×1. Meta data used are kvp, breast volume, HVL and compression force. Embedding dimension n is set to for fast training. The total trainable parameters in the Embedding Layer are:

Embedding Weights (20×4)+FullyConnectWeights (50176×80)+FullyConnectBias (50176×1)=4, 064,336

After 20 hours training, the model yielded a 75% accuracy on testing data. The performance is equivalent to the deep learning model (as in FIG. 1) trained on normalized images.

So in an example tested, the embedding layer introduced a number of trainable parameters from embedding weights and fully connected layer, using training samples, up to and beyond 50,000 images.

Thus, the embedding network learned a correlation between raw image and meta data, then autonomously normalized the image implicitly.

Figure 6:
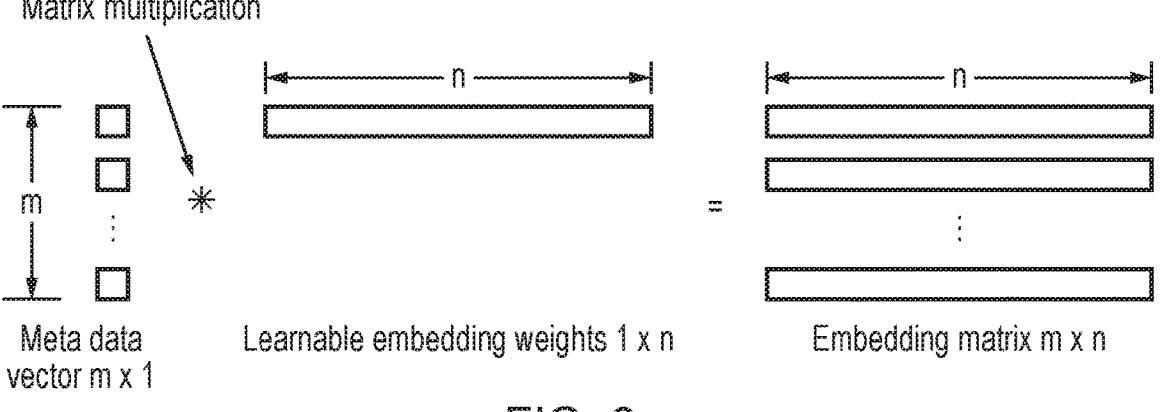
FIG. 6 shows a simplified calculation of the embedding weights matrix.

By modification of the weights matrix, the calculation of the embedding matrix is simplified. FIG. 6 shows an alternative calculation of the embedding matrix via a simplified embedding weights vector. As illustrated in FIG. 6 the weights matrix has a single row of the embedding weights. This may be compared to a portion of the embedding layer shown in FIG. 3 wherein the weights matrix has m rows of embedding weights. Here the number of embedding weights is independent of the size of the meta date vector. Using a column-wise meta data vector $x_1, x_2, \ldots x_m$ and a row-wise embedding weight vector $w_1, w_2, \ldots, w_n$, the matrix multiplication yields an m×n embedding matrix where its element:

$$E_{ij}=x_i{}^*w_j, =1 \ldots m, j=1 \ldots n.$$

The number of embedding weights can be reduced from m×n to n. In other words, the meta data are encoded using a single embedding weights vector of length n instead of m vectors and each of length n.

It is an advantage of such simplification, that the training speed is greatly improved, retaining a test accuracy of around 74%, whilst reducing training cost.

By modification of the position of the embedding layer relative to the convolution layer the time to learn and accuracy of classification may be improved. The embedding layer can be placed after an earlier convolution which may be the first convolution of the network. This is shown in FIG. 7, which can be compared to FIG. 2. In the Conv layer block, assume 32 filters of the size 3×3 with stride [2, 2]. The convolved image size is 112×112×32, which is half size of the raw image. Accordingly, the meta data vector is embedded to a smaller size (112×112×1 instead of 224×224×1 in FIG. 2). Thereby fewer neurons are required in the fully connected layer, further reducing training cost.

Within the classification network, the size (number of rows and columns) of the layer activation normally decrease while its channel increases. For example, using a deep convolutional neural network such as Mobilenetv2, with an input image of 224×224×1, the activation after first convolution is 112×112×32. The activation after the last convolution becomes 7×7×1280.

When the embedding layer is concatenated after the last convolution as in FIG. 8, in the embedding layer the number of weights of the fully connected layer is 7×7×80=3920, and the number of bias is 7×7=49, assuming an embedding dimension 20 and meta data size of 4. The number of weights and bias of the fully connected layer in the embedding layer are 224×224×80=50176×80=4,014,080 and 50,176 respectively if the embedding layer is concatenated with the input image (as in FIG. 2) at the very beginning of the network.

This invention has been described by way of example only, modifications and alternatives will be apparent to those skilled in the art. All such embodiments and modifications are intended to fall within the scope of the claims.

The invention claimed is:

1. An image classification learning network comprising:
an embedding layer comprising learnable embedding weights to encode meta data to provide a learned object; and
a softmax layer to classify a combination of image data and the learned object, wherein the embedding layer comprises a multiplication of a meta data vector comprising the meta data multiplying a weights matrix comprising the learnable embedding weights to create an embedding matrix, and wherein the weights matrix comprises one row of the learnable embedding weights to weight all elements of the meta data equally, wherein the image data and the meta data are obtained from a standardized transmission or storage.

2. The image classification learning network according to claim 1, wherein the embedding layer comprises a fully connected layer of neurons to regress an embedding matrix comprising the learnable embedding weights when encoded with the meta data.

3. The image classification learning network according to claim 2, wherein the embedding matrix is connected to the fully connected layer of neurons.

4. The image classification learning network according to claim 1, wherein a number of the learnable embedding weights are selectable by a user to influence accuracy of classification.

5. The image classification learning network according to claim 1, comprising a convolution layer configured to convolve the learned object provided by the embedding layer when concatenated with the image data.

6. The image classification learning network according to claim 1, comprising a convolution layer which follows a concatenation layer which combines the image data with the learned object.

7. The image classification learning network according to claim 1, comprising a convolution layer configured to provide convolved image data which are further concatenated with the learned object from the embedding layer.

8. The image classification learning network according to claim 1, comprising a convolution layer which leads a concatenation layer which combines the image data convolved by the convolution layer with the learned object.

9. The image classification learning network according to claim 1, where the standardized transmission or storage is configured to extract the image data and/or the meta data from a DICOM® object defined by an international standard for a communication, exchange, transmission and management of medical imaging information across various imaging modalities.

10. The image classification learning network according to claim 1, wherein the softmax layer is configured to provide a probability that a classification category characterizes an image or feature from the image data and meta data.

11. An image classification learning method including:

inputting image data and meta data from a standardized transmission or storage;

transferring the meta data to an embedding layer wherein learnable embedding weights encode the meta data to provide a learned object; and using a softmax layer to classify a combination of the image data and the learned object, wherein the embedding layer comprises a multiplication of a meta data vector comprising the meta data multiplying a weights matrix comprising the learnable embedding weights to create an embedding matrix, and wherein the weights matrix comprises one row of the learnable embedding weights to weight all elements of the meta data equally.

* * * * *